B. W. WOLTERS.
DOUGH RAISING APPLIANCE.
APPLICATION FILED MAY 3, 1920.

1,396,908.

Patented Nov. 15, 1921.

Inventor
Benjamin W. Wolters
By Frank E. Liurauce, Jr.
Attorney

UNITED STATES PATENT OFFICE.

BENJAMIN W. WOLTERS, OF HOLLAND, MICHIGAN.

DOUGH-RAISING APPLIANCE.

1,396,908.  Specification of Letters Patent.  Patented Nov. 15, 1921.

Application filed May 3, 1920. Serial No. 378,530.

*To all whom it may concern:*

Be it known that I, BENJAMIN W. WOLTERS, a citizen of the United States of America, residing at Holland, in the county of Ottawa and State of Michigan, have invented certain new and useful Improvements in Dough-Raising Appliances; and I do hereby declare the following to be a full, clear, and exact description of the invention, such as will enable others skilled in the art to which it appertains to make and use the same.

This invention relates to dough raising appliances, being particularly concerned with various improvements in construction and operation in the construction shown in my Patent No. 1,333,525, issued March 9, 1920. It is a primary object and purpose of the present invention to improve the construction shown in my former patent by elevating the automatic thermostatic regulating means to a higher level with a consequent provision of more space in the inner casing or oven and with said means out of the way and not projecting downwardly into the oven as before. A further object of the invention is to provide the thermostatic regulating means with readily accessible means for adjusting the expansible member of the same to thereby control its action and vary the temperatures at which the oven may be automatically kept, or adjust the same to maintain a constant temperature irrespective of any changes which may take place in the thermostatic regulator from long use or the like.

Figure 1:
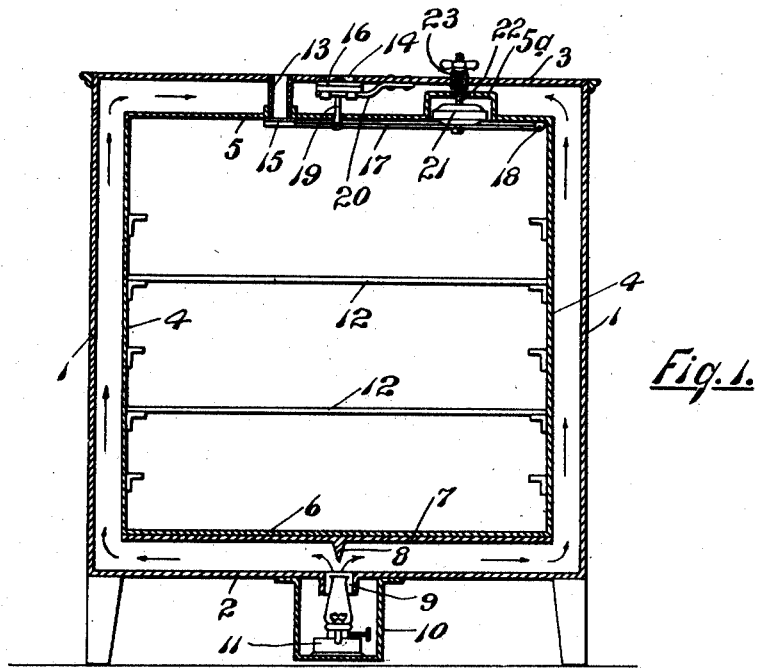

For an understanding of the invention, reference may be had to the following description, taken in connection with the accompanying drawing, in which, Figure 1 is a vertical sectional view taken through the appliance.

Figure 2:
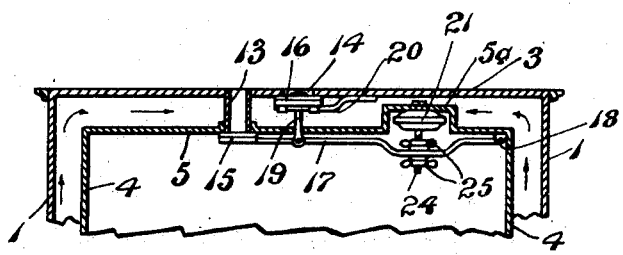
Figure 3:
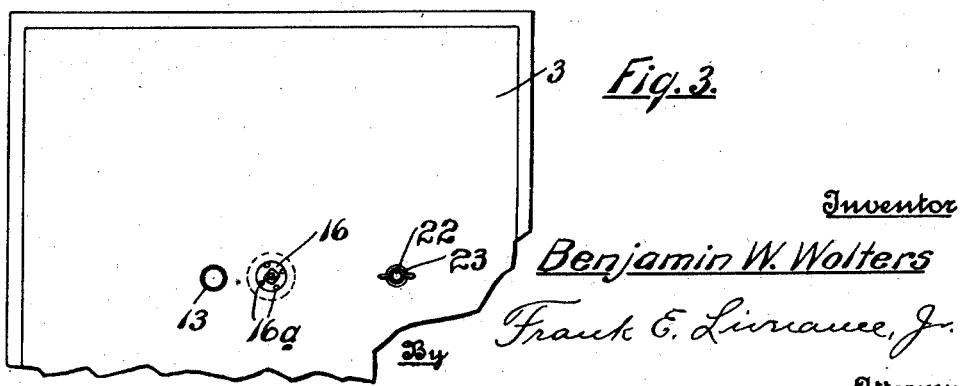

Fig. 2 is a fragmentary vertical sectional view through the upper part of the appliance, a slight modification in construction being shown, and Fig. 3 is a fragmentary plan view of the construction shown in Fig. 1.

Like reference characters refer to like parts in the different figures of the drawing.

In the construction, an outer casing or cabinet is provided, having sides 1, a bottom 2 and top 3. Within said cabinet an inner casing or oven is located having sides 4, a top 5 and a bottom 6 spaced from the sides, top and bottom of the cabinet. A protective covering 7 of asbestos, preferably, or similar non-conducting material is attached to and below the bottom 6, being provided with a deflector 8 of the form shown which is positioned directly over an opening 9 in the bottom 2 of the cabinet. A relatively small casing 10 is attached to and depends from the bottom of the cabinet, being adapted to receive a lamp 11 or similar source of heat. The heated air given off from the lamp passes through opening 9 and is deflected by the deflector 8 outwardly in all directions passing upwardly between the sides of the oven and cabinet. The oven is adapted to receive a plurality of horizontal shelves 12 on which the receptacles containing the dough may be carried.

A sleeve 13 passes through the tops 3 and 5 of the cabinet and oven to connect the interior of the oven with the outside. An opening 14 permits connection of the space between the cabinet and oven with the outside. Valves 15 and 16 are located, respectively under the lower end of the sleeve and below the opening 14. The valve 16 has a plurality of small openings 16ᵃ therethrough so that a steady circulation of heated air may be maintained around the oven. The valve 15 is attached at one end of a lever 17 pivotally mounted at its other end at 18 on the under side of the top of the oven. A link 19 attached to the valve 16 is pivotally connected at its lower end to the lever 17 between its ends. Valve 16 is normally held in upper position by a spring 20 associated therewith and secured to the under side of the top of the cabinet.

A thermostatic wafer 21 is secured to the lever 17, lying above the same. The lever 17 lies very closely adjacent the under side of the top 5 of the oven, and the wafer is received in an upwardly pressed cup 5ᵃ made in the top 5 as shown. This thermostatic wafer expands with rises of temperature and contracts with the falling of temperature as is obvious.

A threaded rod 22 is attached to the upper part of wafer 21 and extends upwardly through the top 3 of the cabinet. A nut 23 threads onto the rod and also is exteriorly threaded and passes through top 3 as shown. The threads on the rod and exteriorly on the nut are opposite so that by turning the nut the valves 15 and 16 may be brought with greater or less pressure against the under sides of the tops of the oven and cabinet and the times when the valves shall open to allow the escape of heated air from said oven and cabinet controlled, thereby making it possible to efficiently regulate the temperature within the oven to any desired degree approximately.

In Fig. 2 a modification is shown, the upper part of the wafer being secured to the cup portion 5ª and a threaded rod 24 extending from the lower portion of the wafer and through the lever 17, thumb nuts 25 being on this rod one above and the other below the lever as shown. With this construction a regulation of the automatic thermostatic valve opening means may be had to change the temperature if desired or to hold the appliance at a fixed working temperature. The former construction is preferred as it is accessible from the outside and there is no need to open the oven for changing or regulating the valve opening devices.

It is evident that the expansion of the thermostatic wafer 21 in each form of the device has the effect of opening the valves simultaneously and allowing the escape of heated air from both the oven and cabinet, resulting in a falling of the temperature, contraction of the wafer and closing of the valves. Accordingly, the temperature is maintained practically constant at all times, varying but slightly at all times; and if a different range of temperature is desired, it is merely necessary to turn the thumb screw 23 in the direction necessary to attain the different range. The location of the valve closing means in the extreme upper portion of the oven eliminates the downward projection of the same into the oven giving more space and making it possible to manufacture the cabinet with less height. The invention is defined in the appended claims and I consider myself entitled to all forms of structure falling within their scope.

I claim:

1. In a device of the character described, an outer cabinet, an inner oven spaced from the cabinet, a sleeve passing through the tops of the oven and cabinet, said top of the cabinet having an opening therein a short distance from the sleeve, a lever lying closely adjacent to and below the top of the oven and pivotally connected at one end, a valve on the opposite end of the lever directly at the lower end of the sleeve, a second valve connected to the lever and located directly under said opening in the top of the cabinet, a thermostatic expansible and contractible device attached to the lever between its ends, the top of the oven being pressed upwardly to form a cup to receive the device, and means for attaching said device to the cabinet.

2. In a device of the character described, an outer cabinet, an inner oven spaced from the cabinet, the top of said oven at one point being pressed upwardly to make a cup-like recess, and said top of the oven and also of the cabinet having outlets thereto communicating with the outside, a valve under each outlet, a pivotally mounted lever to which said valves are connected, an expansible and contractible thermostatic element attached to said lever and located in said recess in the top of the oven, a threaded rod attached to said element and extending through the top of the cabinet, a nut threaded through the top of the cabinet and on to the rod, and means for supplying heated air to the space between the oven and cabinet, substantially as described.

In testimony whereof I affix my signature.

BENJAMIN W. WOLTERS.